US007455555B1

(12) United States Patent
Lai

(10) Patent No.: US 7,455,555 B1
(45) Date of Patent: Nov. 25, 2008

(54) ALL-IN-ONE CARD CONNECTOR PREVENTING CARD FROM ERRONEOUS INSERTION THEREIN AND ALLOWING INSERTION OF CARD ONCE ONLY

(75) Inventor: Yaw-Huey Lai, Taipei County (TW)

(73) Assignee: Tai-Sol Electronics Co., Ltd., Taipei (TW)

( * ) Notice: Subject to any disclaimer, the term of this patent is extended or adjusted under 35 U.S.C. 154(b) by 0 days.

(21) Appl. No.: 12/081,096

(22) Filed: Apr. 10, 2008

(30) Foreign Application Priority Data

Dec. 28, 2007 (TW) .............................. 96150951 A

(51) Int. Cl.
*H01R 24/00* (2006.01)
(52) U.S. Cl. ........................ 439/630; 439/140; 439/160
(58) Field of Classification Search ......... 439/136–140, 439/160, 377, 630–635
See application file for complete search history.

(56) References Cited

U.S. PATENT DOCUMENTS 6,120,322 A * 9/2000 Ho et al. ................. 439/541.5
6,908,321 B1 * 6/2005 Lai ............................ 439/140
7,112,095 B2 * 9/2006 Shen et al. .................. 439/630
7,303,413 B1 * 12/2007 Lai et al. .................... 439/152
2008/0102707 A1 * 5/2008 Lai ............................ 439/630
2008/0132110 A1 * 6/2008 Lai et al. .................... 439/489

* cited by examiner

*Primary Examiner*—James Harvey
(74) *Attorney, Agent, or Firm*—Bacon & Thomas, PLLC

(57) ABSTRACT

An all-in-one card connector includes a base frame, a plurality of terminal sets, two pivotable stoppers, and a shell. Each of the two pivotable stoppers includes a pivotable portion having one end pivoted to a front part of one of two sides of the base frame; and a stopping portion extending transversally from the other end of the pivotable portion toward an inside of the base frame. The two pivotable stoppers are spaced from each other for such an interval that a relatively wide card can work on the two pivotable stoppers at the same time and a relatively narrow card cannot do so. The interval between the two pivotable stoppers is smaller than width of the relatively narrow card. Two springy members are mounted between the base frame and the two pivotable stoppers respectively. The shell covers a part of the base frame.

8 Claims, 11 Drawing Sheets

ALL-IN-ONE CARD CONNECTOR PREVENTING CARD FROM ERRONEOUS INSERTION THEREIN AND ALLOWING INSERTION OF CARD ONCE ONLY

BACKGROUND OF THE INVENTION

1. Field of the Invention

The present invention relates generally to electronic card connectors, and more particularly, to an all-in-one card connector capable of preventing a card from erroneous insertion therein and of allowing insertion of one card at a time only.

2. Description of the Related Art

A conventional all-in-one card connector compatible with a variety of electronic cards allows insertion of the same. To prevent insertion of multiple cards from erroneous access, another conventional all-in-one card connector allowing insertion of one card at a time only was invented.

For example, U.S. Pat. No. 6,908,321 disclosed an all-in-one card connector allowing insertion of one card at a time only. This all-in-one card connector having a movable guide member mounted to bilateral sides therein is operated in such a way that the movable guide member is moved upward and downward to block the entrance of the card connector to prevent other cards from entry into the card connector after one card is inserted.

However, in the above design, the insertion-allowable card must overrun or underrun the movable guide member, such that the movable guide member needs much space for the upward and downward movement and the thickness of the whole card connector could not be lessened. In addition, the above design fails to prevent the card from erroneous insertion.

SUMMARY OF THE INVENTION

The primary objective of the present invention is to provide an all-in-one card connector, which allows insertion of one card at a time only and prevents the card from erroneous insertion therein.

The secondary objective of the present invention is to provide an all-in-one card connector, whose card-receiving space is jointly shared by a variety of cards to have less thickness.

The foregoing objectives of the present invention are attained by the all-in-one card connector composed of a base frame, a plurality of terminal sets, two pivotable stoppers, and a shell. The base frame includes a bottom plate, two sidewalls located at two sides of the bottom plate respectively, an entrance defined at a front end thereof, and a card-receiving space formed therein for receiving at least one relatively wide card or at least one relatively narrow card. The terminal sets are mounted to the base frame. Each of the two pivotable stoppers includes a pivotable portion having one end pivoted to a front part of one of two sides of the base frame and abutting one of the two sidewalls; and a stopping portion extending transversally from the other end of the pivotable portion toward an inside of the base frame. The two pivotable stoppers are spaced from each other for such an interval that the relatively wide card can work on the two pivotable stoppers at the same time and the relatively narrow card cannot work on the two pivotable stoppers at the same time. The interval between the two pivotable stoppers is smaller than width of the relatively narrow card. The two pivotable stoppers are pivotable between an upper position and a lower position. Two springy members are mounted between the base frame and the two pivotable stoppers respectively, for generating resilience that keeps the pivotable stoppers located at the upper position. The shell covers a part of the base frame.

DETAILED DESCRIPTION OF PREFERRED EMBODIMENTS

Figure 1:
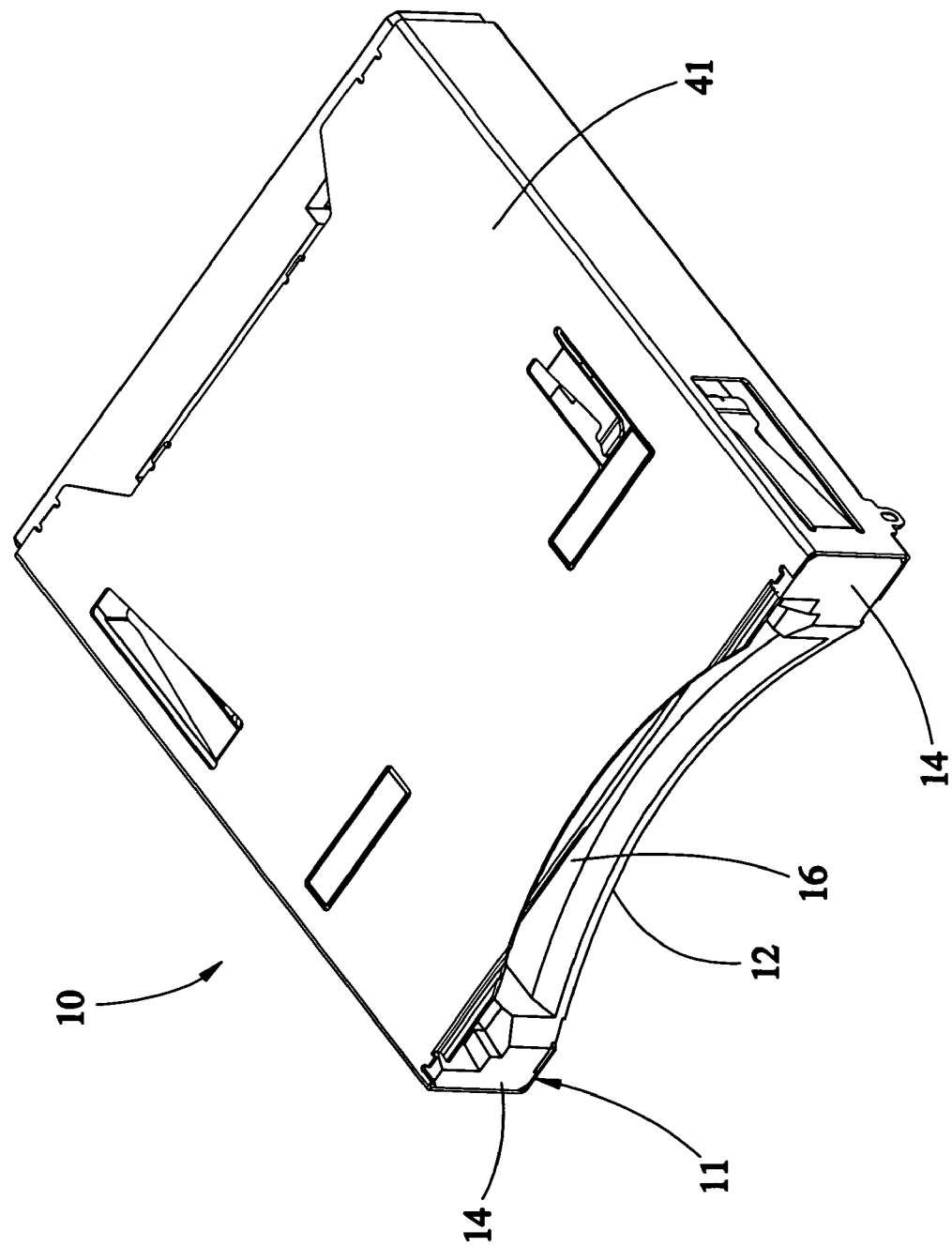
FIG. 1 is a perspective view of a first preferred embodiment of the present invention.
Figure 2:
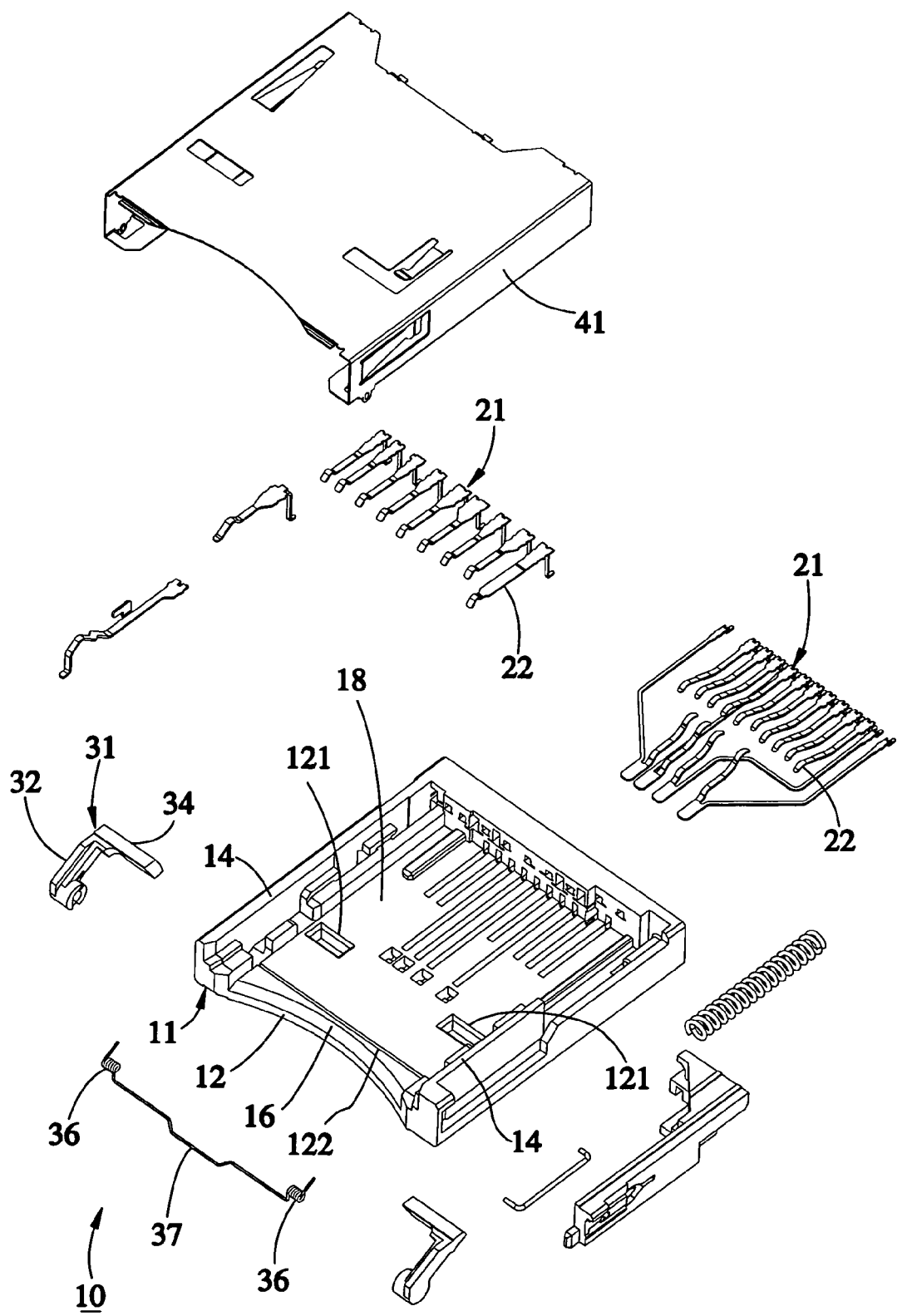
FIG. 2 is an exploded view of the first preferred embodiment of the present invention.

Referring to FIGS. 1-4, an all-in-one card connector 10 capable of preventing a card from erroneous insertion therein and of allowing insertion of one card at a time only, constructed in accordance with a first preferred embodiment of the present invention, is composed of a base frame 11, a plurality of terminal sets 21, two pivotable stoppers 31, and a shell 41.

Figure 5:
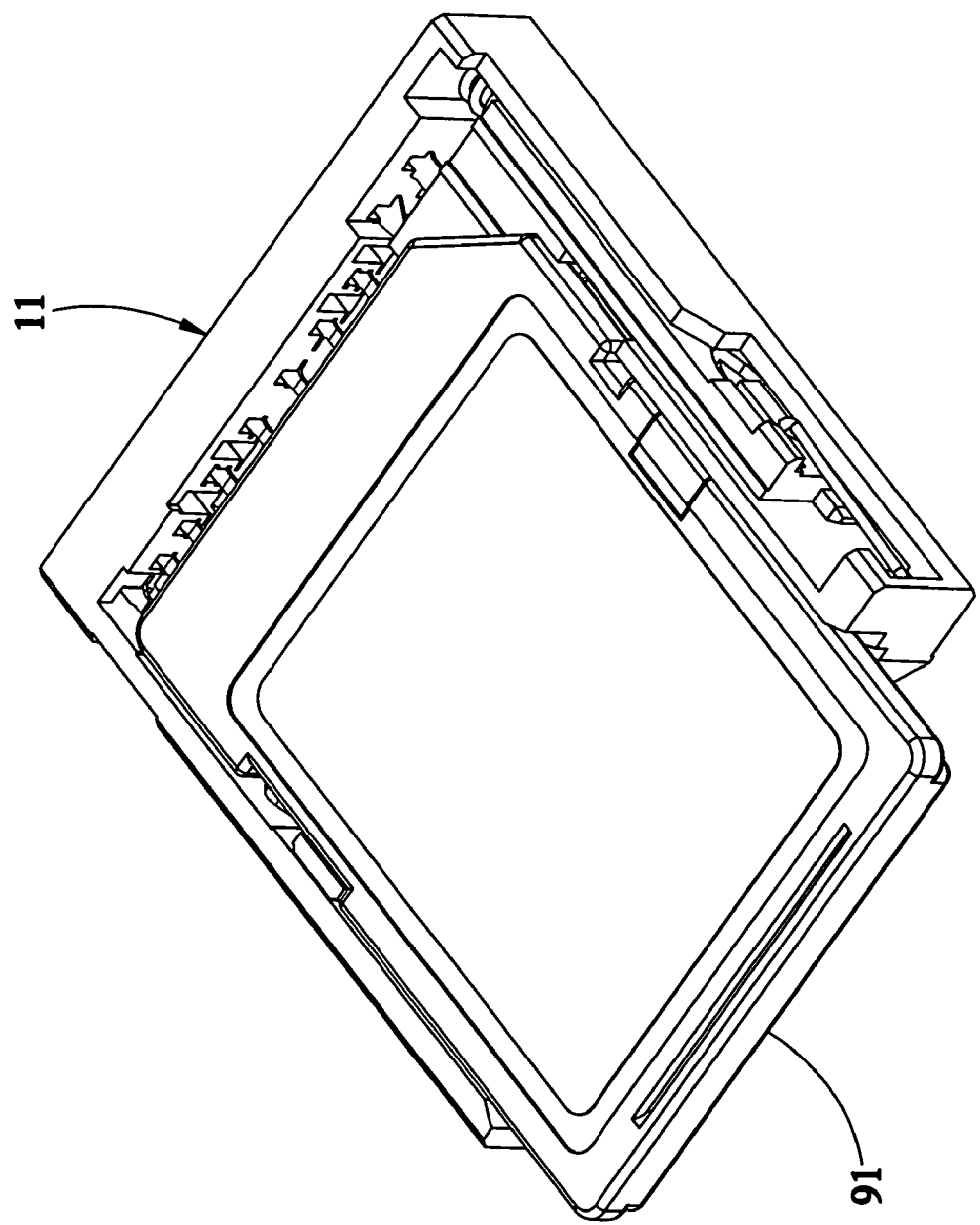
FIG. 5 is similar to FIG. 3, illustrating that the relatively wide card is inserted.
Figure 6:
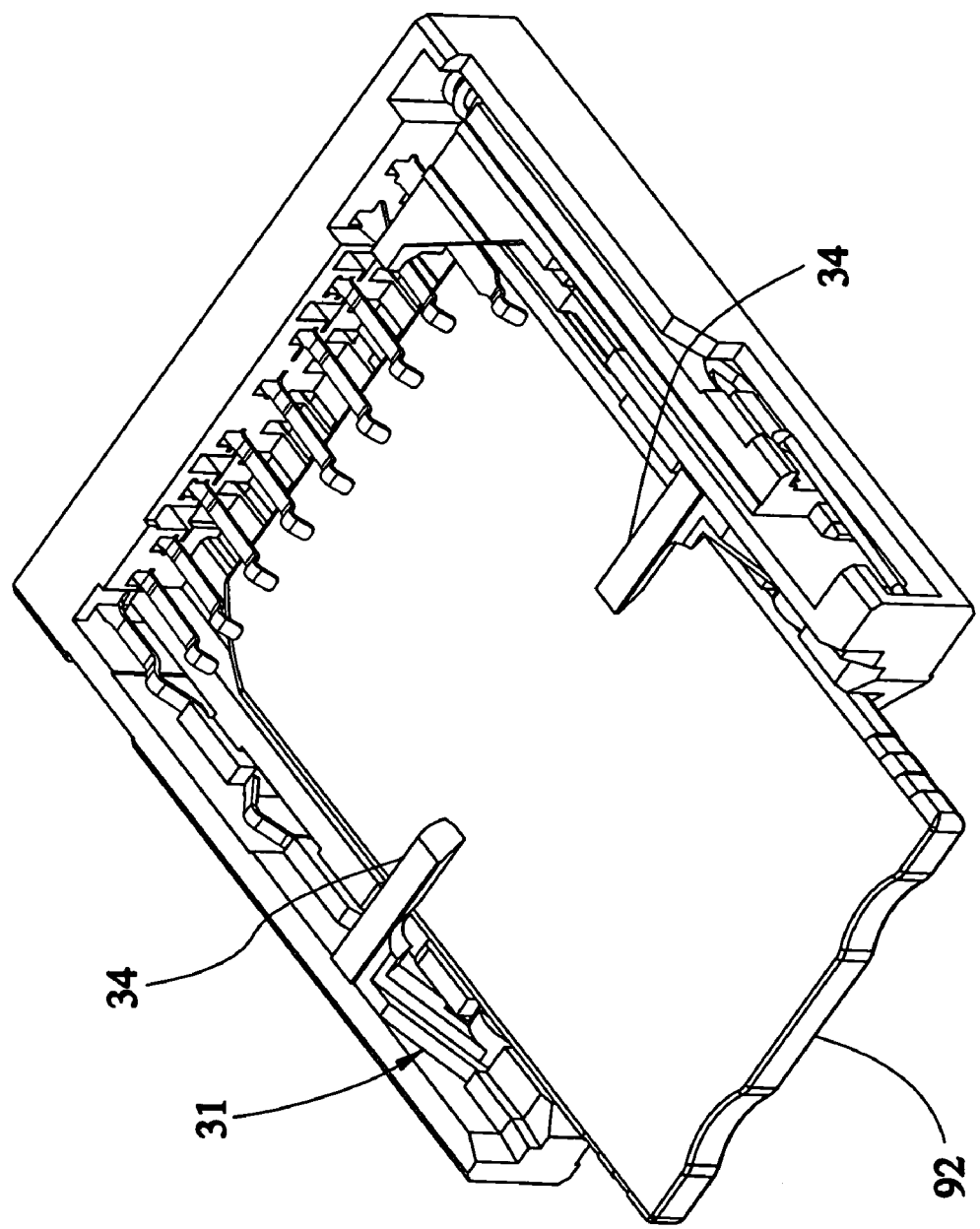
FIG. 6 is similar to FIG. 3, illustrating that the relatively narrow card is inserted.

The base frame 11 includes a bottom plate 12 and two sidewalls 14 located at two sides of the bottom plate 12, defining an entrance 16 at a front end thereof. A card-receiving space 18 is formed in the base frame 11 for receiving at least one relatively wide card 91 (FIG. 5) or at least one relatively narrow card 92 (FIG. 6). The bottom plate 12 has two concavities 121 and an elongated gap 122.

Each of the terminal sets 21 is composed of a plurality of terminals 22 and is mounted to the base frame 11. One of the terminal sets 21 is located above the other terminal set 21.

Each of the two pivotable stoppers 31 includes a pivotable portion 32 abutting one of the two sidewalls 14 and having one end pivoted to a front part of one of two sides of the base frame 11. Each of the two pivotable stoppers 31 further includes a stopping portion 34 extending transversally from the other end of the pivotable portion 32 toward the inside of the base frame 11. The two pivotable portions 32 are spaced from each other for such a predetermined interval that the relatively side card 91 can work on the two pivotable portions 32 at the same time and the relatively narrow card 92 cannot work on the two pivotable portions 32 at the same time. The interval between the two pivotable portions 34 is smaller than the width of the relatively narrow card 92. The two pivotable stoppers 31 are pivotable between an upper position and a lower position. The two cavities 121 are located under the two stopping portions 34. When the pivotable stoppers 31 are located at the lower position, respective lower parts of the two stopping portions 34 partially enter the concavities 121. Two springy members 36 are mounted between the base frame 11 and the pivotable stoppers 31 respectively, fro generating resilience that keeps the pivotable stoppers 31 located at the upper position. The two springy members 36 are connected with each other via a connecting rod 37 located in the elongated gap 122.

It is to be noted that each of the two springy members 36 can be alternatively mounted between the base frame 11 and each of the two pivotable stoppers 31 in such a way that the connecting rod 37 is not connected between the two pivotable stoppers 31. When the two pivotable stoppers 31 are located at the upper position, the pivotable portions 32 are inclined upward and rearward and the stopping portions 34 are inclined downward and rearward; meanwhile, the relatively narrow card 92 can be inserted into what is between the bottom plate 12 and the two stopping portions 34, and bottom edges of the two stopping portions 34 are stopped against a top side of the relatively narrow card 92. When the two pivotable stoppers 31 are located at the lower position, the relatively wide card 91 can be inserted into what is between the two stopping portions 34 and the shell 41.

The shell 41 covers a part of the base frame 11. In this embodiment, the shell 41 fully covers a top side of the base frame 11.

Referring to FIG. 3 again, before any card is inserted into the card connector 10, the two pivotable stoppers 31 are forced by the two springy members 36 to be located at the upper position.

Figure 4:
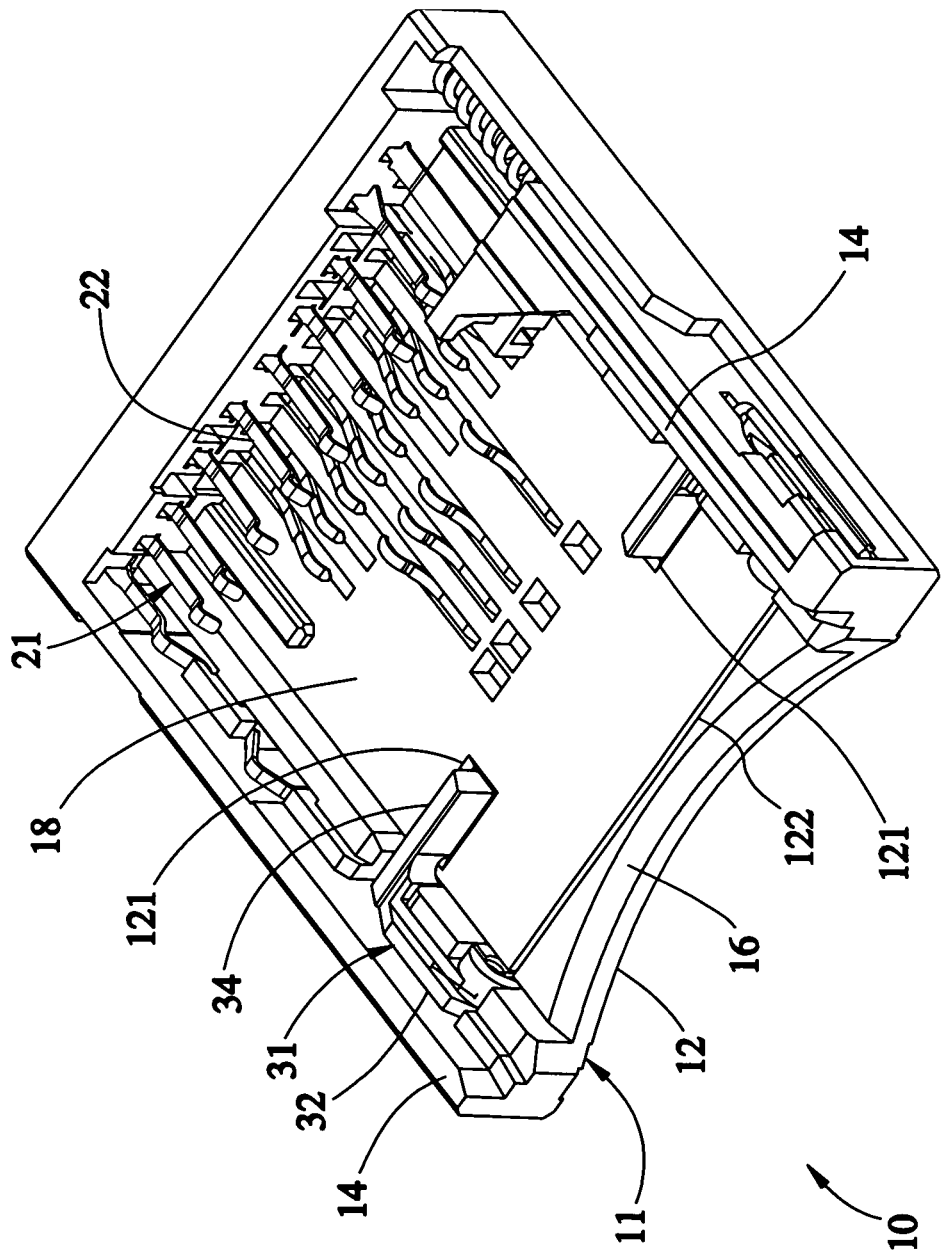
FIG. 4 is similar to FIG. 3, illustrating that the pivotable stopper is located at the lower position.

Referring to FIG. 5 again in view of FIG. 4, during insertion of the relatively wide card 91, a front edge of the relatively wide card 91 works on the pivotable portions 34 of the pivotable stoppers 31 to press the pivotable stoppers 31 downward, and then the pivotable portions 34 enter the two cavities 121; meanwhile, the pivotable stoppers 31 are located at the lower position and thus what is between the two pivotable stoppers 31 and the shell 41 is large enough for passing through by the relatively wide card 91. Finally, the relatively wide card 91 continues to move forward and to be inserted into the rearmost part inside the card connector 10, finishing the insertion of the relatively wide card 91. Referring to FIG. 4 again, while located at the lower position, the pivotable stoppers 31 can block what is under the relatively wide card 91 to stop the relatively narrow card 92 (FIG. 6) from entry into the same. The relatively wide card 91 is ejected in such a way reverse to the aforesaid insertion that the two pivotable stoppers 31 are finally forced by the two springy members 36 (FIG. 2) to return to the upper position.

Figure 3:
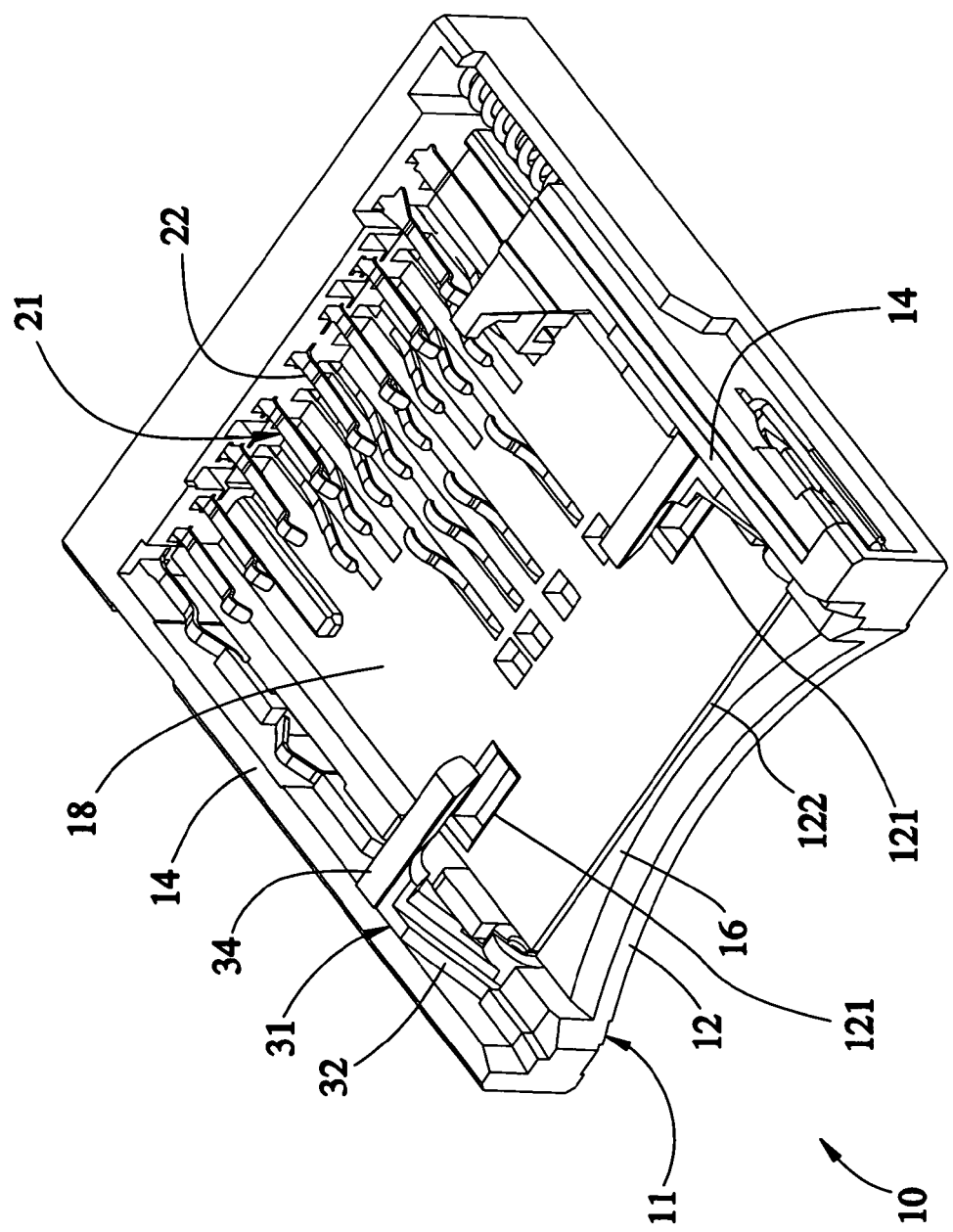
FIG. 3 is another perspective view of the first preferred embodiment of the present invention from which the shell is removed, illustrating that the pivotable stopper is located at the upper position.

Referring to FIG. 6 again in view of FIG. 3, during insertion of the relatively narrow card 92, a front edge of the relatively narrow card 92 is stopped and guided by the two stopping portions 35 to move downward and finally enter what is between the bottom plate 12 and the two pivotable portions 34. After the relatively narrow card 92 continues to be inserted into the rearmost part inside the card connector 10, the insertion of the relatively narrow card 92 is finished. In the meantime, the two pivotable portions 31 are located above the relatively narrow card 92 and stopped against upper sides of the relatively narrow card 92. While located at the upper position, the two pivotable stoppers 31 can block what is above the relative narrow card 92, so that the relatively wide card 91 fails to be inserted through what is above the relatively narrow card 92. When the relatively narrow card 92 is ejected, it can be ejected straight outside without any action of the pivotable stoppers 31.

Figure 7:
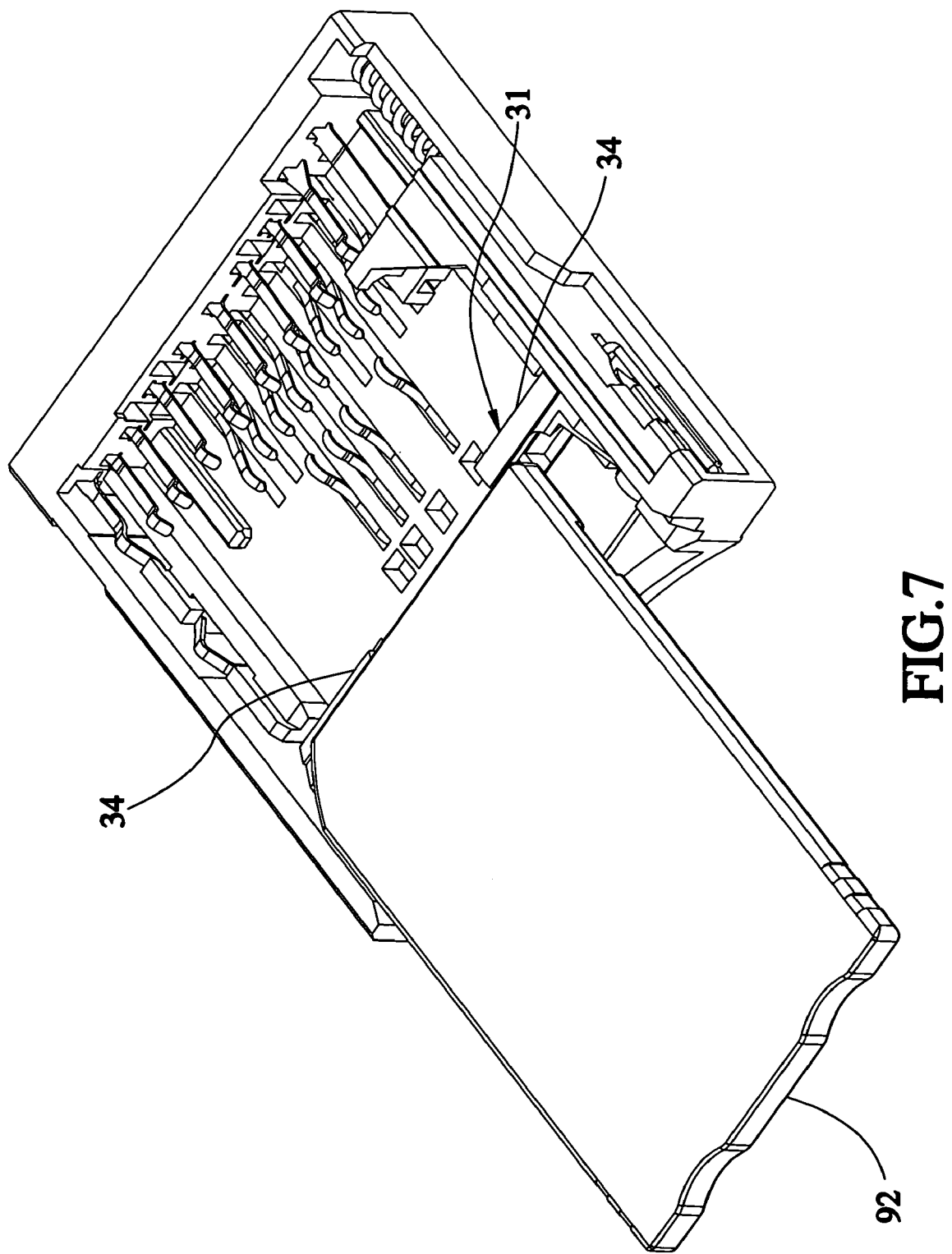
FIG. 7 is similar to FIG. 3, illustrating that the relatively narrow card is erroneously inserted by partializing itself toward one side.

Referring to FIG. 7 in view of FIG. 3, when the relatively narrow card 92 is inserted and partialized toward one side, e.g. left side, it forces the left pivotable portion 32 to pivot downward. In the meantime, the front edge of the relatively narrow card 92 does not work on the right pivotable stopper 31, such that the right pivotable stopper 31 does not pivot downward and the front edge of the relatively narrow card 92 is stopped by the right stopping portion 34 from moving forward, thus avoiding erroneous card insertion. The relatively narrow card 92 is stopped in the same way while inserted and partialized toward the right side, such no more recitation is necessary.

Figure 8:
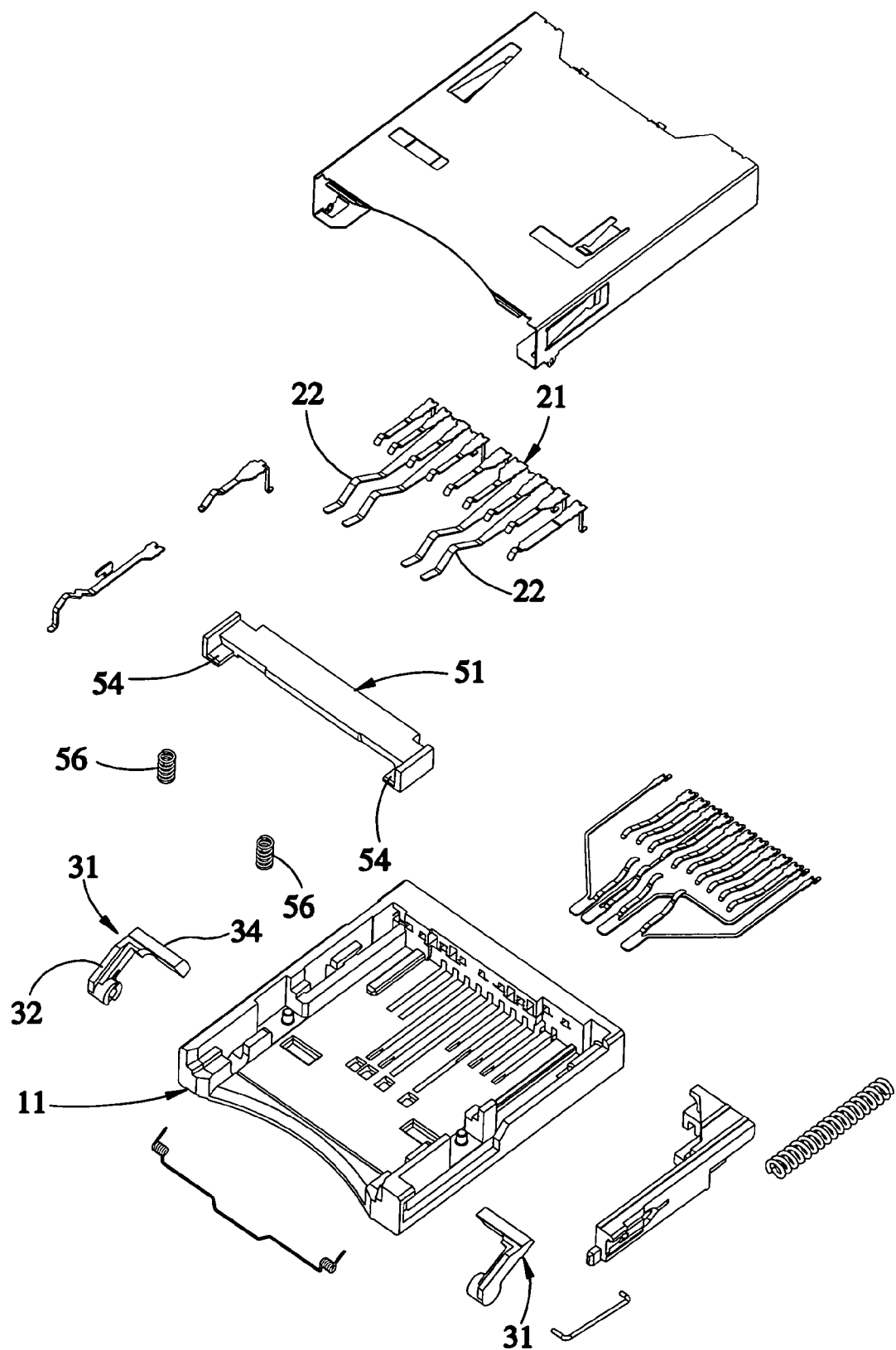
FIG. 8 is an exploded view of a second preferred embodiment of the present invention.
Figure 9:
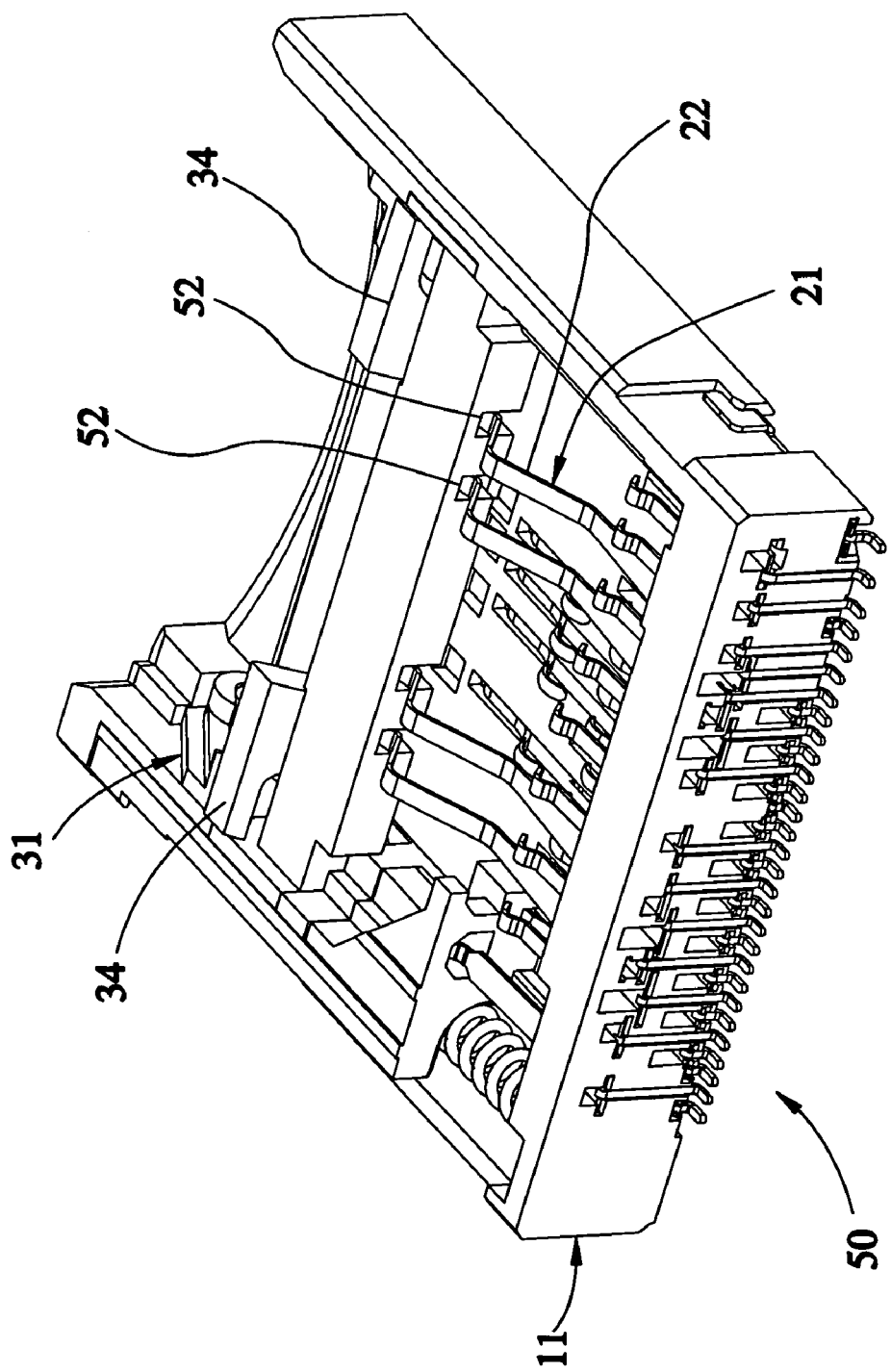
FIG. 9 is a perspective view of the second preferred embodiment of the present invention from which the shell is removed.
Figure 10:
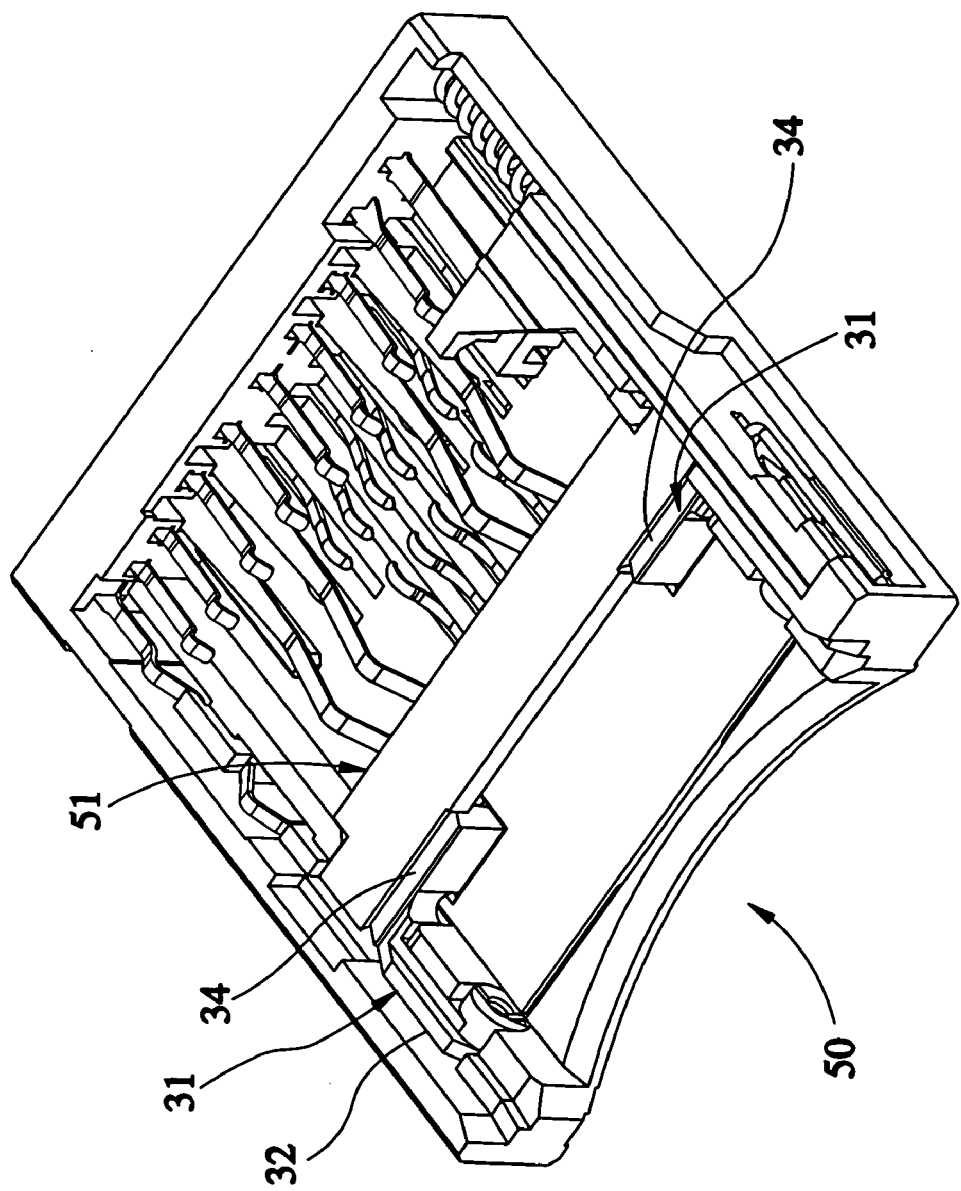
FIG. 10 is a perspective view of the second preferred embodiment of the present invention from which the shell is removed, illustrating that the pivotable stoppers and the hoist are located at the lower position.

Referring to FIGS. 8-10, an all-in-one card connector 50 capable of preventing a card from erroneous insertion therein and of allowing insertion of one card at a time only, constructed in accordance with a second preferred embodiment of the present invention, is similar to the all-in-one card connector 10 of the first embodiment but different as recited below.

The all-in-one card connector 50 further includes an elongated hoist 51 and two springs 56. The hoist 51 has a plurality of terminal slots 52 formed at a rear bottom side for receiving some terminals 22. A forced portion 54 extends forward from each of two sides of the hoist 51, being stopped against a bottom side of each of the two pivotable portions 32. When the two pivotable stoppers 31 pivot downward, the forced portions 54 are forced by the two pivotable stoppers 31 to lower. The two springs 56 are mounted between the hoist 51 and the base frame 11 and located at two sides of the base frame 11 respectively, for generating resilience that keeps the hoist 51 rising. In light of this, when the two pivotable stoppers 31 are located at the lower position, the two pivotable stoppers 31 press the two forced portions 54 and the terminals 22 received in the terminal slots 52 to further press the hoist 51 to the lower position, such that the relatively wide card 91 can overrun the hoist 51 and the relatively narrow card 92 is stopped from entry. When the two pivotable stoppers 31 are located at the upper position, the relatively narrow card 92 can underrun the two pivotable stoppers 31 and the relatively wide card 91 is stopped from entry.

Figure 11:
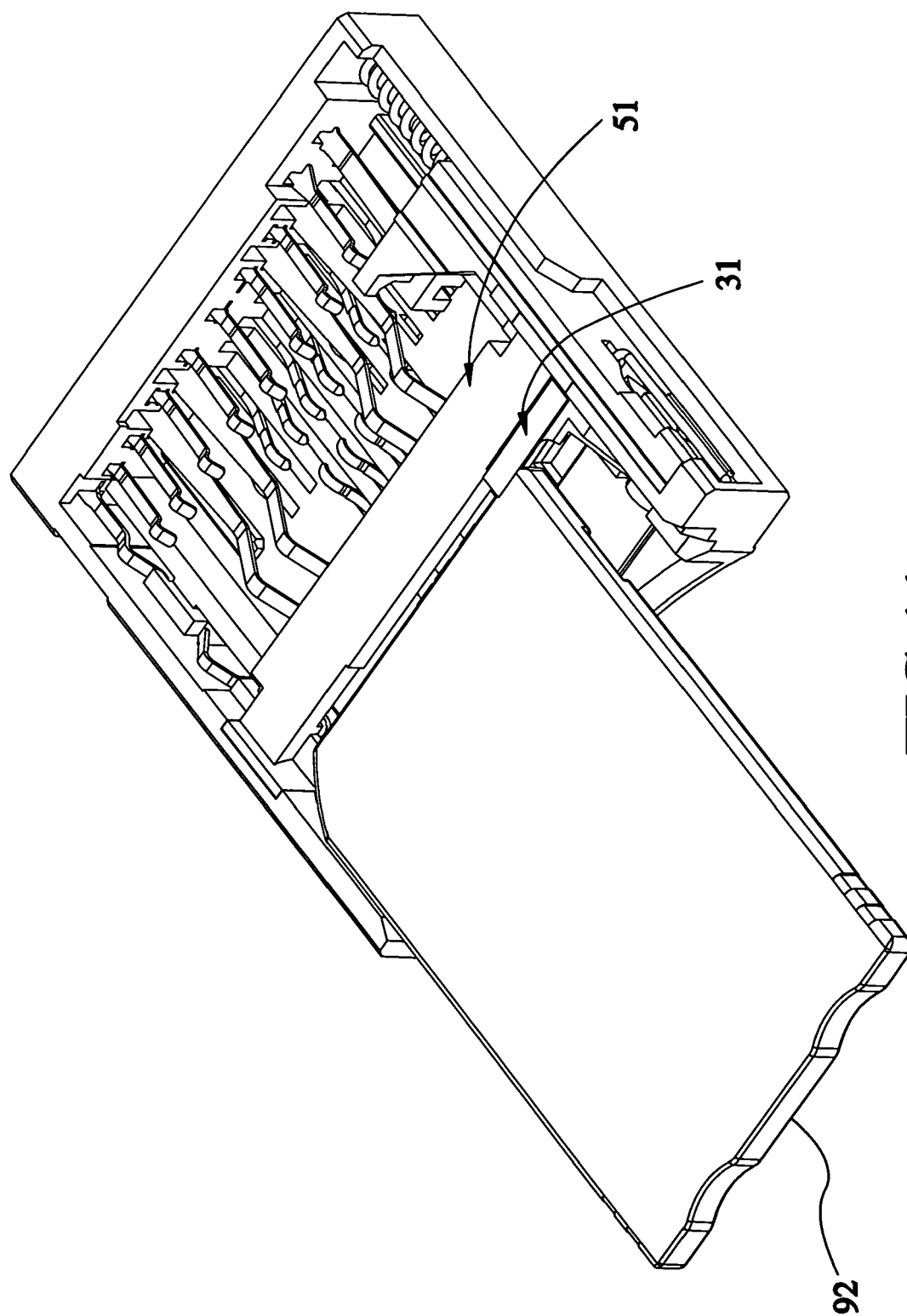
FIG. 11 is similar to FIG. 10, illustrating that the relatively narrow card is erroneously inserted by partializing itself toward one side.

Referring to FIG. 11 in view of FIG. 10, when the relatively narrow card 92 is erroneously inserted by partializing itself toward one side, only one pivotable stopper 31 is forced to pivot downward, only one forced portion 54 of the hoist 51 is pressed downward, and the other pivotable stopper 31 still keeps at the upper position, such that the relatively narrow card 92 can still be stopped from entry. The other structures and operations of the second embodiment are the same as those of the first embodiment, such that detailed recitation is omitted.

In conclusion, the present invention includes the following advantages and effects.

1. The two pivotable stoppers are designed for insertion of one card only at a time and of avoiding erroneous card insertion.

2. Where the relatively wide card is received in the card-receiving space partially overlaps where the relatively narrow card is received in the card-receiving space, such that the thickness of the whole card connector is relatively lessened.

Although the present invention has been described with respect to a specific preferred embodiment thereof, it is no way limited to the details of the illustrated structures but changes and modifications may be made within the scope of the appended claims.

What is claimed is:

1. An all-in-one card connector capable of preventing a card from erroneous insertion therein and of allowing insertion of one card at a time only, comprising:

a base frame having a bottom plate, two sidewalls located at two sides of said bottom plate respectively, an entrance defined at a front end thereof, and a card-receiving space formed therein for receiving at least one relatively wide card or at least one relatively narrow card;

a plurality of terminal sets mounted to said base frame;

two pivotable stoppers each having a pivotable portion and a stopping portion, each of said pivotable portions having two ends, one of which is pivoted to a front part of one of two sides of said base frame and close to one of said two sidewalls, each of said stopping portions extending transversally from the other end of said pivotable portion toward an inside of said base frame, said two pivotable stoppers being spaced from each other for an interval that is smaller than width of said relatively narrow card, said two pivotable stoppers being pivotable between an upper position and a lower position, two springy members being mounted between said base frame and said pivotable stoppers respectively for generating resilience that keeps said pivotable stoppers located at the upper position and meanwhile said pivotable portions being inclined upward and rearward; and a shell covering a part of said base frame.

2. The all-in-one card connector as defined in claim 1, wherein said two stopping portions are inclined downward and rearward while said two pivotable stoppers are located at the upper position.

3. The all-in-one card connector as defined in claim 2, wherein said bottom plate comprises two cavities located under said two stopping portions respectively and while said pivotable stoppers pivot to the lower position, respective lower parts of said two stopping portions partially enter said two cavities respectively.

4. The all-in-one card connector as defined in claim 1, wherein said relatively narrow card is allowed for entry into what is between said two stopping portions and said base plate and bottom edges of said two stopping portions are stopped against a top side of said inserted relatively narrow card when said two pivotable stoppers are located at the upper position.

5. The all-in-one card connector as defined in claim 1, wherein said two springy members each are a spring and they are connected with each other by a connecting rod.

6. The all-in-one card connector as defined in claim 5, wherein said bottom plate comprises an elongated gap, and said connecting rod is located in said elongated gap.

7. The all-in-one card connector as defined in claim 1 further comprising an elongated hoist and two springs mounted between said base frame and said elongated hoist respectively and located at two sides of said base frame respectively for generating resilience that keeps said elongated hoist rising, wherein said elongated hoist includes two forced portions extending forward from two sides thereof and stopped against lower sides of said two pivotable stoppers respectively, whereby said forced portions are forced to lower when said two pivotable stoppers pivot downward.

8. The all-in-one card connector as defined in claim 7, wherein said two forced portions are stopped against said two pivotable portions.

* * * * *